Nov. 5, 1968   T. W. HATHAWAY   3,409,750
LIQUID LEVEL FLOAT SWITCH
Filed Aug. 26, 1966
FIG.1
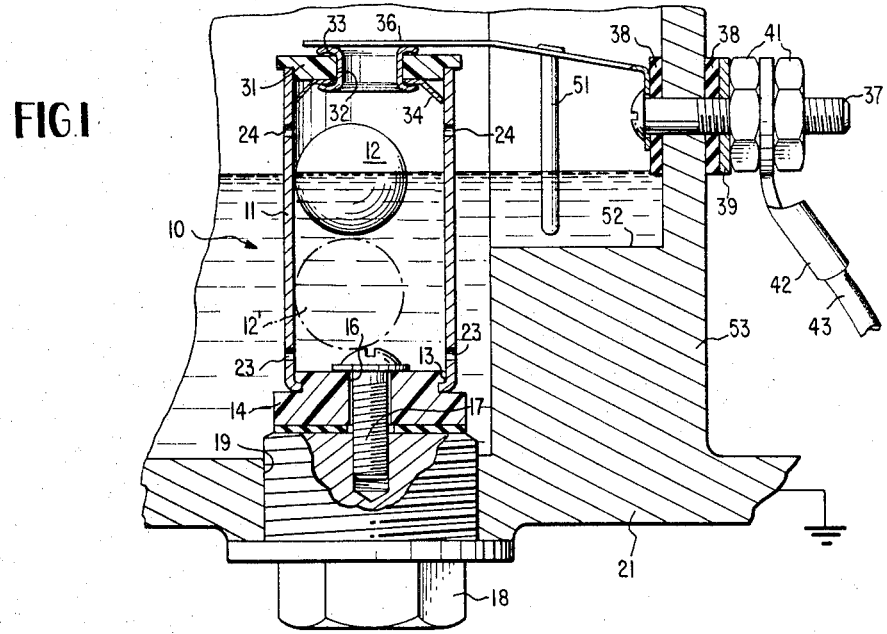
FIG.2
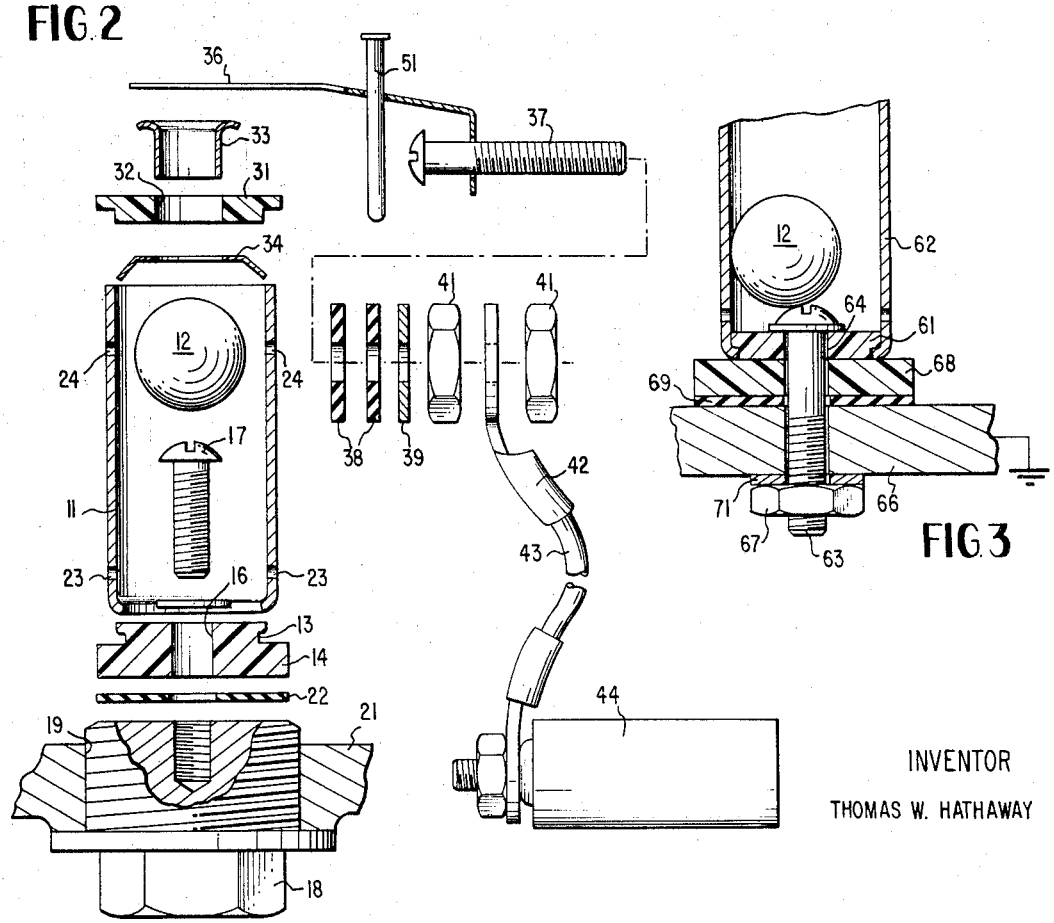
FIG.3
INVENTOR
THOMAS W. HATHAWAY United States Patent Office
3,409,750
Patented Nov. 5, 1968

3,409,750
LIQUID LEVEL FLOAT SWITCH
Thomas W. Hathaway, 1844 Brown Ave.,
Manchester, N.H. 03103
Filed Aug. 26, 1966, Ser. No. 575,437
3 Claims. (Cl. 200—84)

ABSTRACT OF THE DISCLOSURE

A liquid level switch which includes a sleeve made of electrically conducting material which is mounted in a container having a supply of liquid. The bottom of the sleeve is enclosed with an insulating ring which surrounds and separates a metal contact area from the wall of the sleeve in order to form a switch gap in the enclosed bottom area. The metal contact area is a bolt which connects the sleeve, the insulating ring and a drain plug positioned in the bottom of the container together so as to form a unitary device. A ball float is positioned inside the sleeve having at least its surface area covered with a conductive material. The ball normally floats above the bolt and therefore does not bridge the gap between the bolt and the wall of the sleeve. When the liquid level reaches a predetermined low level, the ball float bridges the gap between the bolt and the sleeve to close the switch gap. A further improvement includes a device for detecting an improper placement of the drain plug by energization of an alarm circuit.

This invention relates to apparatus for sensing the liquid level in a container, and more particularly, a float type switch for completing a circuit when the liquid level in a container drops below a predetermined point.

State of the prior art

In the past there have been employed various different designs of float type switches. In most cases, the switches were unduly complicated and expensive to manufacture. Another problem has been the low reliability of the float switches in that they sometimes become subject to the condition known as "air-bound" which results in a false indication of the liquid level. Another problem is that the float switches which have been known in the past are normally not usable in a liquid in which there is much turbulence or pressure variations. When float switches are used in such an environment, they frequently give erroneous readings because of the tendency of the ball float to move up and down as the pressure and liquid level fluctuates. Thus, there is a need for a simple and inexpensive float switch which will not be subject to such fluctuations and which can dampen the pressure and liquid level variations so that they are not communicated to the ball float.

Another consideration is that it is frequently desirable to install a liquid level switch into a motor or other piece of machinery after it has already been assembled and sold. Thus, there is a need for a liquid level switch which can be easily installed into such an apparatus without making major modifications thereto. For example, if it were desired to install a liquid level switch in the motor of a lawn mower, it would probably be necessary to disassemble the motor itself in order to install a level switch of known types therein. The cost and inconvenience of such a procedure is obvious, and the need for an alternative should be apparent.

A still further problem is that most of the float type liquid level switches which have been used in the past utilize a pair of spaced contact prongs positioned in some sort of a tube; and when the ball float bridges the prongs, the switch is closed. These prongs are normally made of bent strips of metal which are very susceptible to being deformed out of shape. Thus, it is not uncommon that with the prongs so bent out of shape the ball float does not make proper contact and an indication of a low liquid level is not reliably reported.

Objects

It is an object of the present invention to provide a new and improved liquid level switch which is simple, easily manufactured and has a minimum of parts.

It is another object of the invention to provide a liquid level float type switch which can be used in a supply of liquid which is subject to rapid pressure and level fluctuations without giving erroneous readings.

It is still another object of the invention to provide a liquid level float type switch which readily can be installed in an assembled piece of equipment, such as an engine, without anything more than a minor modification thereto.

It is a further object of the invention to provide a liquid level float type switch which is not subject to the condition known as air-bound thereby alleviating the false liquid level indications which result therefrom.

It is a still further object of the invention to provide a liquid level float type switch which has facilities for dampening the movement of the ball float as the pressure and liquid level conditions vary.

Drawings

Other objects, advantages and aspects of the invention will become apparent by reference to the following detailed description and drawings of specific embodiments thereof, wherein:

FIG. 1 is a vertical sectional view of the liquid level switch showing the ball float in its upper position wherein it is out of contact with the contact area; and showing in phantom line the ball float bridging the gap between a metal contact area and the wall of the float cylinder;

FIG. 2 is an exploded vertical sectional view showing the manner of assembly of the various component parts of the liquid level switch shown in FIG. 1; and FIG. 3 is a partial vertical sectional view of another embodiment of the invention, and particularly showing an alternative construction of the mounting of the switch.

Description of the invention

Referring to FIGS. 1 and 2, there is shown the improved liquid level float type switch mounted in association with the oil pan of a typical engine or motor. For the purposes of this description the liquid level switch will be described in terms of its application to such an engine, but it is to be understood that this is merely by way of example and in no way limits this switch to such an engine. The instant liquid level switch is particularly adapted for any liquid supply which is subject to rapid changes in liquid level and/or pressure fluctuations which would render most prior art liquid level float type switches unusable.

In FIGS. 1 and 2, the float switch is designated generally 10 and includes a cylinder or sleeve or other type of container 11 which is made of electrically conducting material. It is to be understood that it is not necessary that the sleeve 11 be made entirely of electrically conducting material; and it is only necessary that the sleeve 11 be designed so as to form a conducting member to complete an electrical circuit, as will be described more fully hereinafter. Positioned within the sleeve 11 is a ball float 12. The ball float is preferably made of a lightweight floatable material such as cork in its core, and is covered on its peripheral surface with a metallic material which is a good electrical conductor. It should be apparent that it is only necessary that the density of the ball float 12 be such that it will float in the particular liquid in which it is to be used. The bottom of the sleeve 11 is crimped inwardly so as to engage a groove 13 in an insulator ring 14 thereby holding the two members together. The insulator ring 14 is provided with a central aperture 16 which receives a holding bolt 17 made of electrically conducting material. The holding bolt 17 is threaded on its exterior surface and is received in an interiorly threaded drain plug 18 which is conventionally used in the oil pan of most motors and engines. The drain plug 18 has exterior threads 19 for engaging the bottom of an oil pan 21. A gasket 22 can be provided between the drain plug 18 and the insulator ring 14 for preventing leakage of the oil.

The natural laws of surface tension dictate that the ball float 12 adhere to the interior surface of the sleeve 11 when the sleeve is filled with a liquid. The holding bolt 17 forms a contact which acts in conjunction with the wall of the sleeve 11 to form a switch gap which is electrically insulated by the insulator ring 14. When the ball float 12 is in its raised position as shown at 12 (FIG. 1), the switch gap is not bridged and an open circuit between the sleeve 11 and the holding bolt 17 exists. When the liquid level in the oil pan drops below a predetermined level the ball float 12 (as shown at 12' in phantom line, FIG. 1) contacts the upper surface of the holding bolt 17, and bridges the gap between the bolt 17 and the wall of the sleeve 11, thus, closing the switch. It should be apparent that various types of spacers and the size and shape of the holding bolt 17 can be selected to adjust the liquid level at which the ball float 12 closes the switch gap.

The lower portion of the sleeve 11 is provided with a plurality of bleeder holes 23 through which the oil is free to pass. In the upper portion of the sleeve 11 additional bleeder holes or vent holes 24 are provided. Depending on the level of oil in the oil pan, the holes 24 may either permit passage of oil therethrough, or, if the liquid level is below the holes 24, then air in the engine will be present and the holes 24 will act as vents. The size and quantity of the holes 23 and 24 are selected so that a restricted amount of oil may pass therethrough. This fact in combination with the enclosed and confined area in which the ball float 12 is positioned acts as a dampener if liquid level or pressure fluctuations within the oil pan occur. Thus, it is important that the bottom of the sleeve 11 be substantially enclosed except for the bleeder holes 23 and 24 so that rapid fluctuations in the conditions within the oil pan are not communicated to the interior of the sleeve 11.

The upper portion of the sleeve 11 is enclosed with an insulator cap 31 which has a central aperture 32. A grommet 33 is mounted in the aperture 32 and holds a spring like prong 34 against the bottom of the cap 31. The prong 34 has two functions, first that of holding the insulator cap 31 in place on the top of the sleeve 11, and secondly, providing a circuit path from the sleeve 11 to the grommet 33. A resilient terminal contact spring 36 engages the upper surface of the grommet 33 when the drain plug 18 is threaded into the bottom of the oil pan 21. The contact spring 36 is secured in place above the grommet by any conventional means such as a bolt 37, insulator washers 38, flat washer 39, and nuts 41. The bolt 37 is preferably secured to some part of the oil pan housing to position the terminal contact spring 36 permanently above the drain plug 18.

In the event the oil level drops below a predetermined point, it is desirable to disable the ignition system of the engine. In the alternative it may be desirable to illuminate a light or actuate an audible alarm to alert the operator of the unsatisfactory oil level condition. In an ignition system such as that of a conventionally powered lawn mower, the engine can be disabled by grounding the condenser, as shown in FIG. 2. Thus, a terminal connector 42 is mounted on the terminal bolt 37 and connected by a terminal wire 43 to the condenser 44. It should be apparent that numerous other ways of disabling the engine would occur to one skilled in the art. Thus, for example, a relay could be provided which would be energized when the ball float closed the switch gap between the holding bolt 17 and the sleeve 11. This relay could then operate contacts in the ignition system which are normally closed in and which would be opened by the energization of the relay to disable the motor.

In FIG. 1 there is also shown a safety shorting pin 51 which is fastened to the contact spring 36. The pin 51 is aligned with a shoulder 52 (FIG. 1) in a wall 53 of the oil pan housing. Whenever the safety pin engages the shoulder 52, the circuit is completed and the condenser is grounded. Thus, the safety shorting pin 51 bypasses the liquid level float switch 10 and can be used to disable the engine or actuate suitable alarms. When the drain plug 18 is properly threaded into the oil pan 21 the grommet 33 engages the end of the contact spring 36 and raises the safety shorting pin 51 to a position out of contact with the shoulder 52. Thus, under normal conditions the condenser is not grounded by the safety shorting pin 51. If the drain plug 18 is improperly installed, or if the drain plug becomes loose and begins to unthread from the oil pan 21, the safety shorting pin 51 engages the shoulder 52 and automatically disables the engine or actuates a suitable alarm.

The embodiment of the liquid level switch shown in FIGS. 1 and 2 is particularly suitable for installation into an already assembled engine. In this case, the drain plug 18 readily can be modified to receive the holding bolt 17 and the sleeve 11 and other component parts of the liquid level switch. Addition of the terminal wire 43, contact spring 36 and the securing means therefor, is all that is necessary to complete the installation.

A simplified embodiment of the invention, shown in FIG. 3, is desirable where the liquid level switch is to be installed when the engine is initially assembled. The embodiment shown in FIG. 3 includes an insulator ring 61 around which is crimped the bottom of a sleeve 62. The insulator ring 61 receives a bolt 63 through a central aperture 64 so that the sleeve 62 and the insulator member 61 can be secured directly to the oil pan housing 66 by a nut 67. An additional insulator member 68 is used to insure that the sleeve 62 is insulated from the housing 66. Gaskets 69 and 71 can be provided on either side of the housing 66 to insure a tight fit. The ball float 12 is positioned within the sleeve 62 and operates to bridge the switch gap formed between the bolt 63 and the wall of the sleeve 62 in a manner similar to that shown in the embodiment of FIGS. 1 and 2. The sleeve 62 is also provided with bleeder holes and other details of construction which are similar to those of the first embodiment.

In operation, under normal conditions when the oil level is at a sufficient height, the ball float 12 floats above the holding bolt 17 so that an open switch gap exists between the holding bolt 17 and the wall of the sleeve 11. Thus, the circuit which connects the condenser 44 to ground is open. The bleeder holes 23 and 24 permit free ingress and egress of oil from the pan into the interior of the sleeve 11. However, the size and quantity of the holes is selected so that a desired amount of dampening is effected. Thus, when rapid fluid pressure or fluid level fluctuations occur within the engine, these fluctuations are not communicated to the interior of the sleeve 11, and an erroneous indication of a low oil level is avoided. It has also been found that the bleeder holes 23 and 24 are self-cleaning and not subject to clogging with foreign matter. When the liquid level in the oil pan drops below a predetermined point (as determined by the height of the holding bolt 17) the ball float 12 bridges the gap between the holding bolt 17 and the sleeve 11. This completes the circuit from the condenser 44 to ground to disable the engine. Also, other alarms can be used in addition to, or in lieu of the disabling circuit.

It is to be understood that the above described arrangements of apparatus and construction of elemental parts are simply illustrative of an application of the principles of the invention, and many other modifications may be made without departing from the invention.

What I claim is:

1. A liquid level switch for use directly inside a container of liquid, wherein the container is of the type having a base mounted drain plug, the improvement which comprises:
- a sleeve made of an electrically conducting material positioned inside the container itself;
- a base member for enclosing the bottom of the sleeve, said member being made of nonconducting material and having a central aperture;
- a bolt positioned in the aperture, one end of the bolt extending upwardly into the sleeve to form a switch gap with the wall of the sleeve, and the other end of the bolt being threaded into the drain plug so that the liquid level switch forms a unitary device with the plug for installation and removal therewith;
- means for communicating the liquid in the container into the inside of the sleeve; and
- a float having at least its surface area covered with conducting material positioned inside the sleeve for normally floating above the upwardly extending end of the bolt and for bridging the gap between the bolt and the sleeve when the liquid reaches a predetermined low level to close the switch.

2. A liquid level switch as recited in claim 1 which further includes means for detecting an improper placement of the drain plug.

3. A liquid level switch as recited in claim 2 wherein said detecting means comprises:
- an electrical circuit which, upon energization, gives a warning indication;
- a metal arm attached to and extending from a wall of the container, said arm being positioned in axial alignment with the upper end of the sleeve;
- a pin connected to the arm extending downwardly toward the base of the container, said pin being of such a length as to contact the base and energize the circuit whenever the plug is improperly positioned in the container, and said pin being urged away from the base by the upper end of the sleeve when the plug is properly positioned in the container.

References Cited

UNITED STATES PATENTS

| | | | |
|---|---|---|---|
| 2,874,243 | 2/1959 | Metzler | 200—84 |
| 2,717,935 | 9/1955 | Hartwick | 200—84 |
| 2,613,294 | 10/1952 | McNea | 200—84 |
| 1,642,434 | 9/1927 | Faunce | 200—84 |
| 1,202,757 | 10/1916 | Barnes | 200—84 |

BERNARD A. GILHEANY, *Primary Examiner.*

R. COHRS, *Assistant Examiner.*